(12) United States Patent
Hoshihara et al.

(10) Patent No.: US 7,520,568 B2
(45) Date of Patent: Apr. 21, 2009

(54) SEAT RECLINING APPARATUS

(75) Inventors: Naoaki Hoshihara, Obu (JP); Sadao Ito, Anjo (JP); Hideo Nihonmatsu, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/572,813

(22) PCT Filed: Jul. 27, 2005

(86) PCT No.: PCT/JP2005/014163

§ 371 (c)(1),
(2), (4) Date: Jan. 29, 2007

(87) PCT Pub. No.: WO2006/011649

PCT Pub. Date: Feb. 2, 2006

(65) Prior Publication Data

US 2008/0001458 A1    Jan. 3, 2008

(30) Foreign Application Priority Data

Jul. 28, 2004    (JP) .............................. 2004-220893

(51) Int. Cl.
*B60N 2/235* (2006.01)
(52) U.S. Cl. .................. 297/367; 297/362.11
(58) Field of Classification Search .............. 297/361.1, 297/362.11, 362, 366, 367
See application file for complete search history.

(56) References Cited

U.S. PATENT DOCUMENTS 3,401,979 A * 9/1968 Putsch ........................ 297/362
4,113,308 A * 9/1978 Werner et al. ................ 297/362
4,504,091 A * 3/1985 Ohshiro ....................... 297/362
4,629,251 A * 12/1986 Tezuka ........................ 297/362
4,732,425 A * 3/1988 Terada et al. ................. 297/362

(Continued)

FOREIGN PATENT DOCUMENTS

| EP | 1 359 051 | 11/2003 |
|---|---|---|
| FR | 2 071 277 | 9/1971 |
| FR | 2 743 764 | 7/1997 |
| GB | 2 218 627 | 11/1989 |
| JP | 61-37849 | 3/1986 |
| JP | 62-224310 | 10/1987 |
| JP | 9 313285 | 12/1997 |

*Primary Examiner*—David Dunn
*Assistant Examiner*—Patrick Lynch
(74) *Attorney, Agent, or Firm*—Oblon, Spivak, McClelland, Maier & Neustadt, P.C.

(57) ABSTRACT

A seat reclining apparatus includes a fine angle adjustment mechanism for finely adjusting an angle between a seat cushion and a seat back of a seat and including a planetary gear mechanism having a first gear provided to a seat cushion side of the seat for relative rotation with the seat cushion and a second gear fixed to a seat back side of the seat and an engaging/disengaging mechanism for controlling the relative rotation between the seat cushion and the seat back of the seat and including a base plate fixed to the seat cushion side and a stopper member provided to the base plate and engageable with or disengageable from the first gear. The relative rotation of the first gear with respect to the seat cushion is restricted when the stopper member engages with the first gear and the relative rotation of the first gear to the seat cushion is allowed when the stopper member disengages from the first gear. The seat reclining apparatus is characterized in that a first shaft for inputting an operating force to the fine adjustment mechanism is arranged approximately coaxially with a second shaft for transmitting an operating force to the engaging/disengaging mechanism.

6 Claims, 5 Drawing Sheets

U.S. PATENT DOCUMENTS

| | | | |
|---|---|---|---|
| 5,553,922 A | * | 9/1996 | Yamada ........................ 297/362 |
| 5,611,599 A | * | 3/1997 | Baloche et al. .............. 297/367 |
| 5,755,491 A | * | 5/1998 | Baloche et al. .............. 297/362 |
| 5,820,218 A | * | 10/1998 | Baloche et al. .............. 297/367 |
| 6,318,806 B1 | * | 11/2001 | Levert et al. ................. 297/367 |
| 7,014,260 B2 | * | 3/2006 | Moriyama et al. ............ 297/15 |

\* cited by examiner

SEAT RECLINING APPARATUS

TECHNICAL FIELD

The present invention relates to a seat reclining apparatus and more particularly, to a seat reclining apparatus including a fine adjustment mechanism and an engaging/disengaging mechanism.

BACKGROUND ART

A seat reclining apparatus for adjusting an angle of a seat back of a vehicle seat requires functionality: to finely adjust the angle of the seat back so that an occupant can have an appropriate posture for driving the vehicle; to change the angle of the seat back backward by a large angle so that an occupant can use the seat like a bed, and to change the angle of the seat back forward by a large angle so that an occupant of the vehicle can get into/out of a rear seat of the vehicle with two doors. In particular, it takes a long time to fold the seat back forward when getting in or out of the vehicle from the rear seat and it would be inconvenient if the only mechanism provided to fold the seat is one that electrically and steplessly adjusts the angle of the seat back. Therefore, the seat reclining apparatus requires a mechanism for folding the seat back.

According to JPS62-224310A, to overcome the problems described above, a seat reclining apparatus conventionally includes a stepless adjustment mechanism configured from a planetary gear mechanism including a combination of a gear fixed to a seat back side and a gear fixed to a seat cushion side. A gear tooth portion is provided at an outer side of the seat back side or the seat cushion side of the planetary gear mechanism. A stopper member for engaging with the gear tooth portion is further provided. The stopper member is operated to engage/disengage by an operational lever. Then, the seat back can be laid backward or forward.

However, according to the conventional technique described above, one gear of the planetary gear mechanism and a mechanism relating to the operational lever are arranged side by side at an oblong base plate provided at the seat cushion. Further, the stopper member is provided adjacent to the planetary gear on the same plane thereof. Then, when the operational lever is operated, the stopper member is moved to engage to/disengage from the gear tooth portion (outer gear tooth) formed along periphery of the planetary gear. Then, the angle of the seat back can be roughly adjusted. Therefore, an area of the reclining apparatus seen from the side of the seat reclining apparatus becomes a sum of an area of the planetary gear and that of the stopper member. Accordingly, a size of the seat reclining apparatus tends to be made too large for a limited space in which the seat reclining apparatus should be installed. In addition to that, a design of the seat reclining apparatus tends to be degraded, and costs for manufacturing the seat tend to become higher because a size of a resin cover for covering the mechanism or the number of covers required is increased.

A need thus exists for a seat reclining apparatus, which is compact and enables to finely and roughly adjust an angle of a seat back.

DISCLOSURE OF THE INVENTION

The present invention was made in view of the above circumstances and provides such a seat reclining apparatus.

According to the present invention, a seat reclining apparatus includes a fine angle adjustment mechanism for finely adjusting an angle between a seat cushion and a seat back of a seat and including a planetary gear mechanism having a first gear provided to a seat cushion side of the seat for relative rotation with respect to the seat cushion and a second gear fixed to a seat back side of the seat and an engaging/disengaging mechanism for controlling the relative rotation between the seat cushion and the seat back of the seat and including a base plate fixed to the seat cushion side and a stopper member provided to the base plate and engageable with or disengageable from the first gear. The relative rotation of the first gear with respect to the seat cushion is restricted when the stopper member engages with the first gear and the relative rotation of the first gear to the seat cushion is allowed when the stopper member disengages from the first gear. The seat reclining apparatus is characterized in that a first shaft for inputting an operating force to the fine adjustment mechanism is arranged approximately coaxially with a second shaft for transmitting an operating force to the engaging/disengaging mechanism.

BRIEF DESCRIPTION OF THE DRAWINGS

The foregoing and additional features and characteristics of the present invention will become more apparent from the following detailed description considered with reference to the accompanying drawing figures in which like reference numerals designate like elements.

BEST MODE FOR CARRYING OUT THE INVENTION

Figure 1:
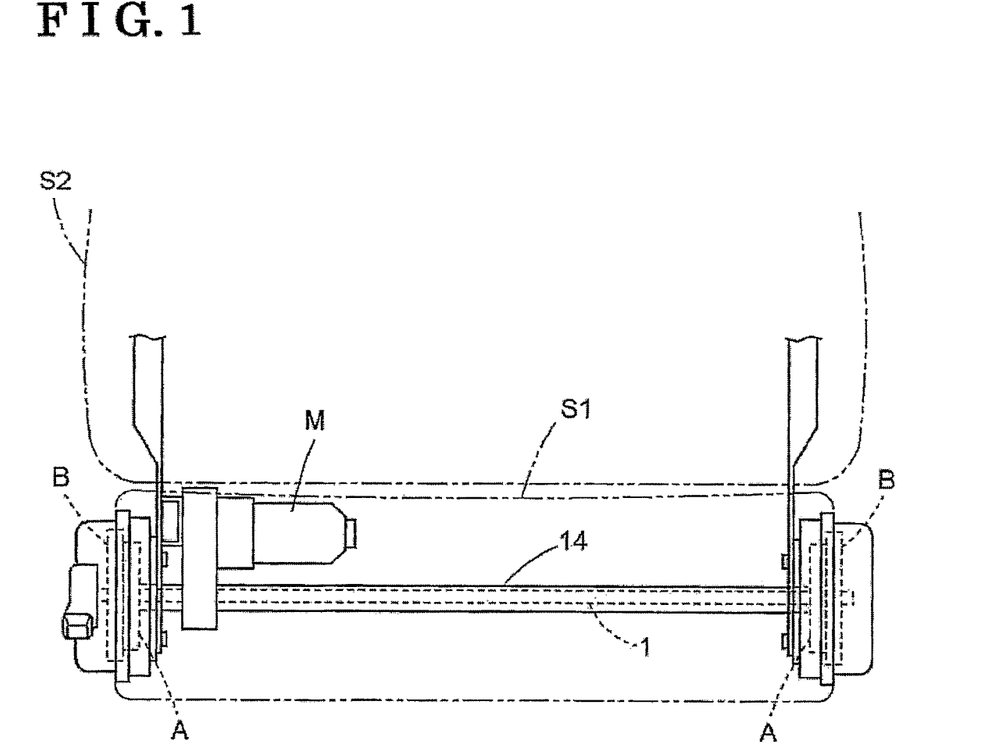
FIG. 1 represents an explanatory diagram of a seat reclining apparatus seen from the back of the seat.
Figure 2:
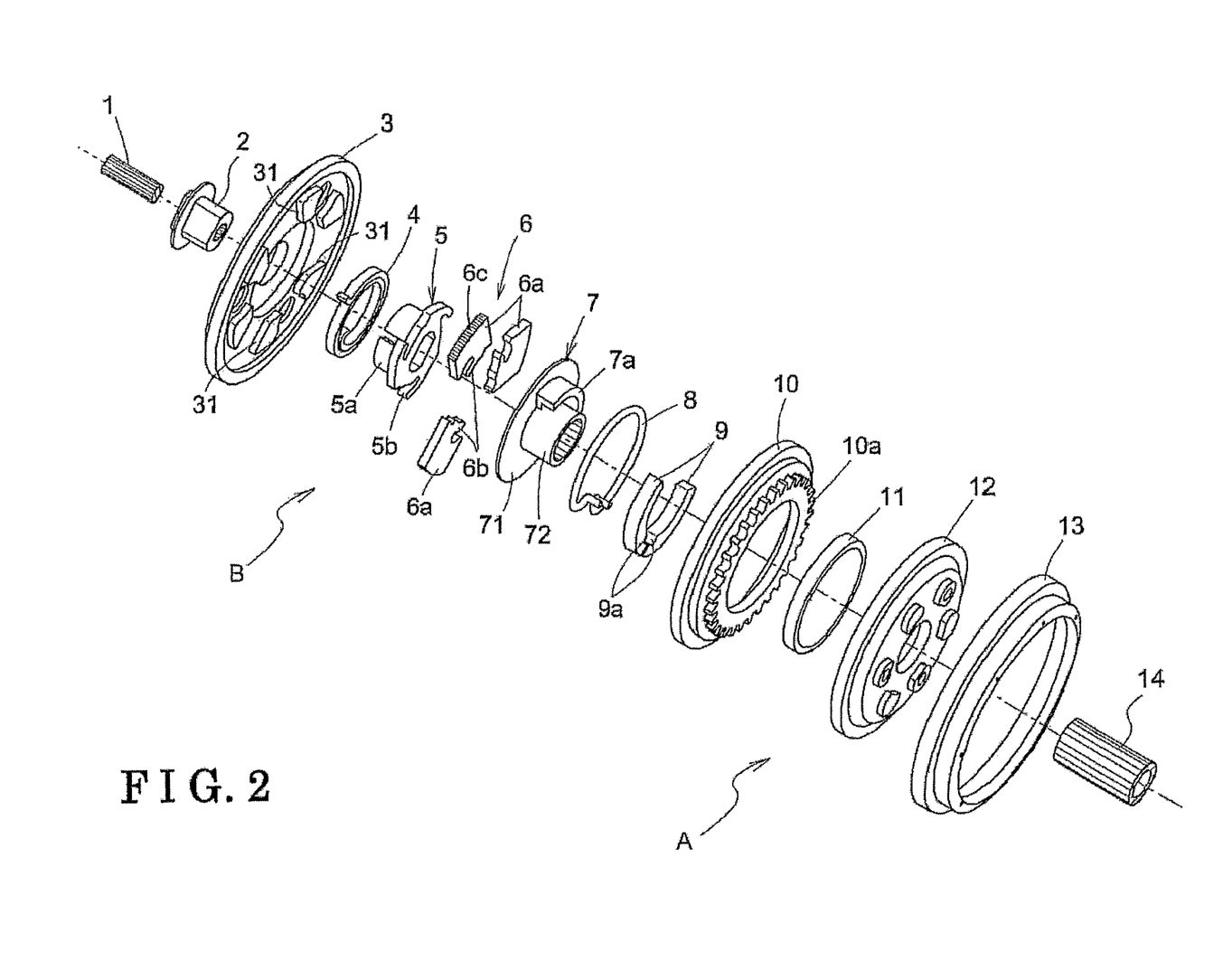
FIG. 2 represents an exploded perspective view illustrating a substantial part of the seat reclining apparatus.
Figure 3:
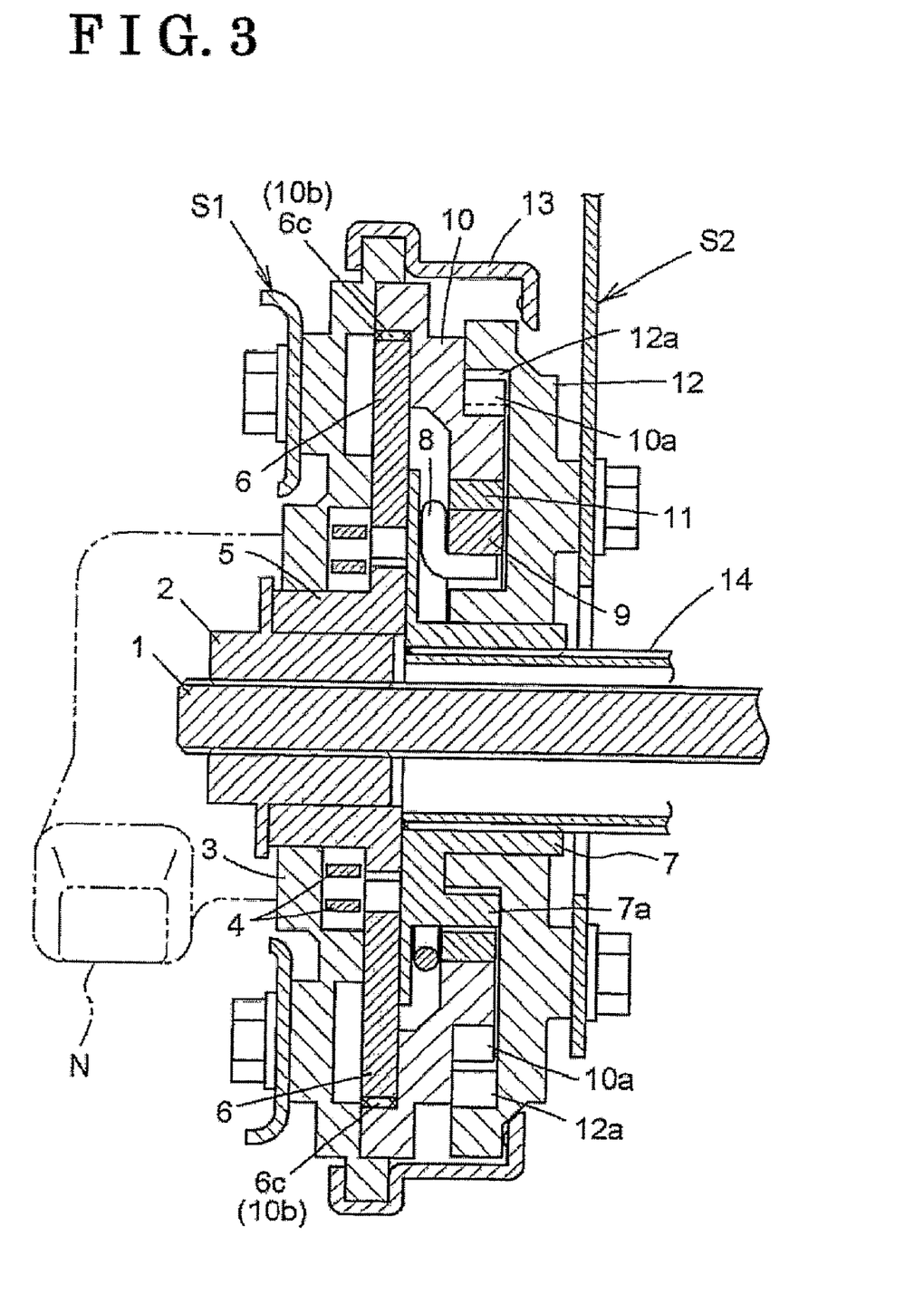
FIG. 3 represents a cross-sectional view illustrating a substantial side part of the seat reclining apparatus.
Figure 4A:
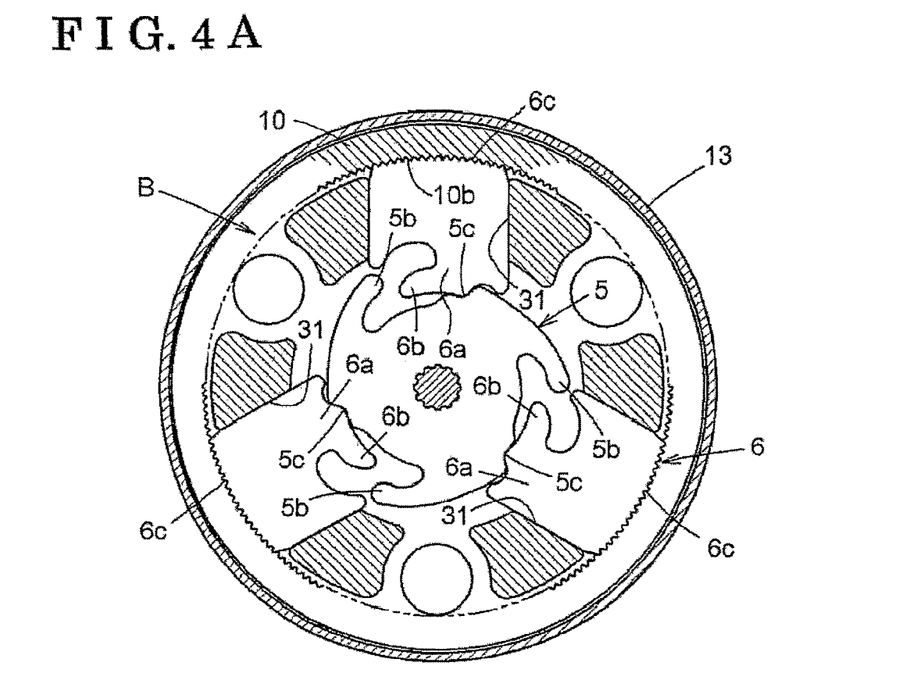
FIG. 4 represents an explanatory diagram illustrating an engaging/disengaging mechanism in detail.
Figure 4B:
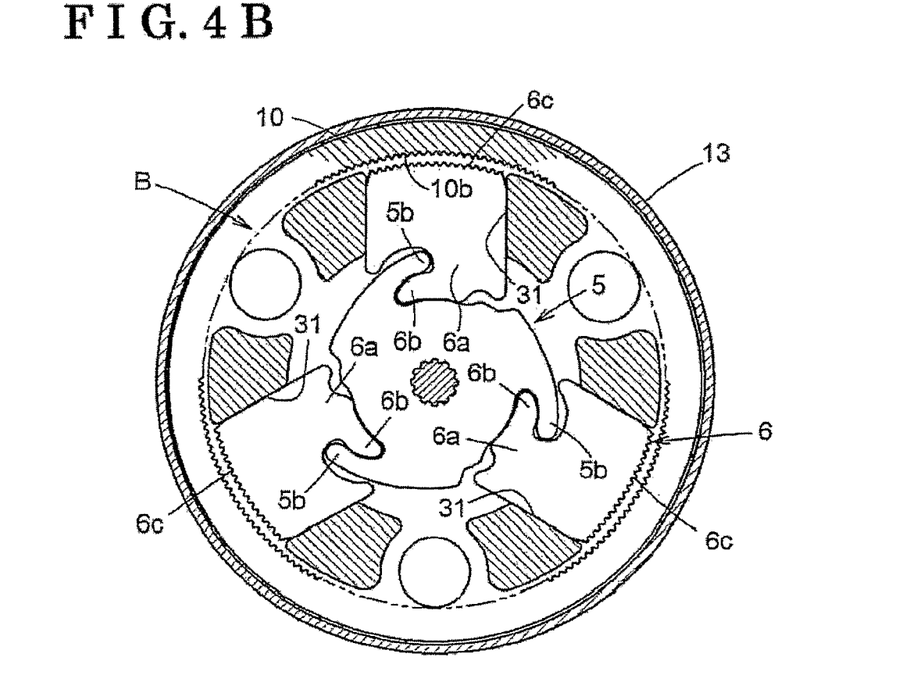
Figure 5:
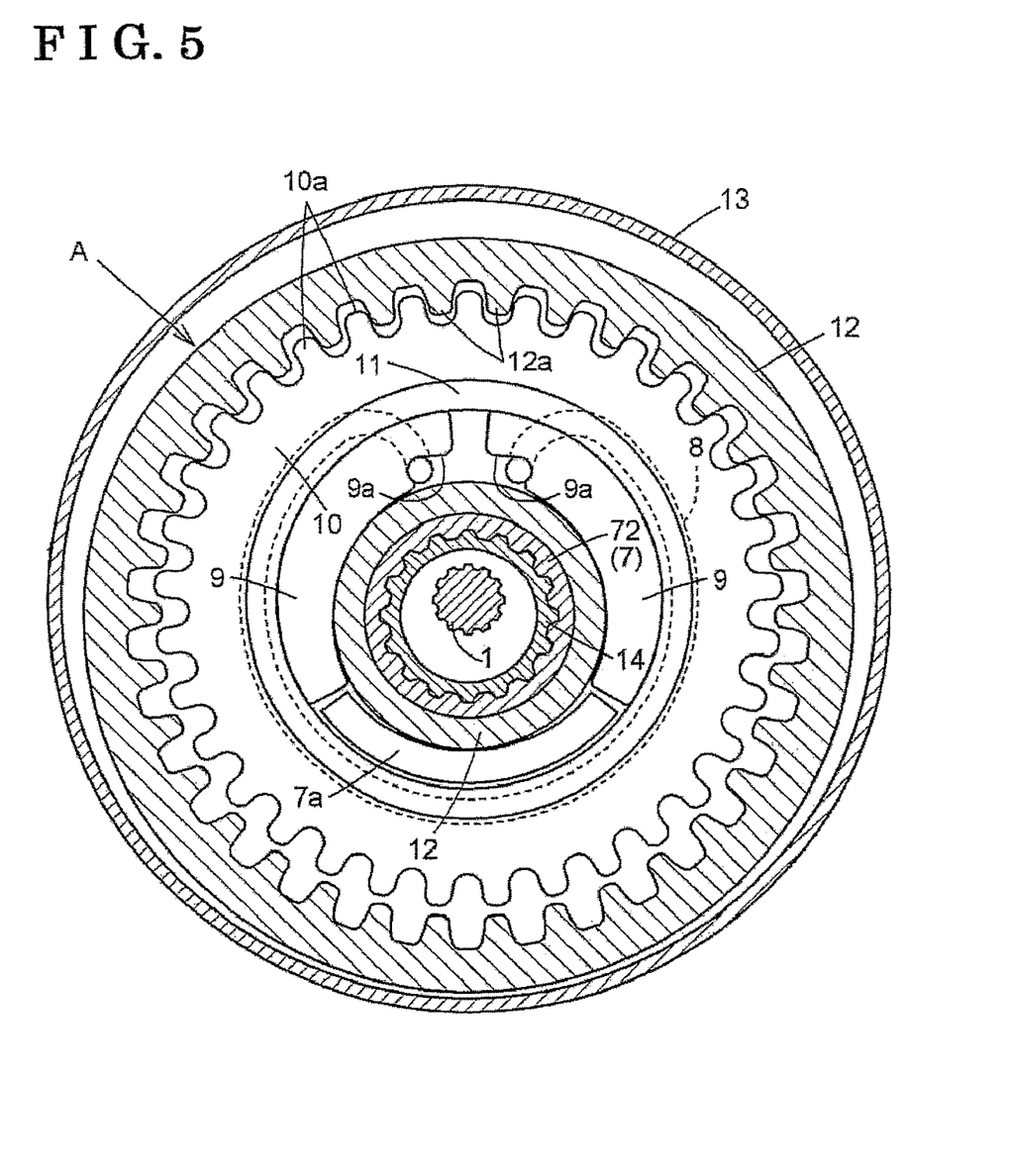
FIG. 5 represents an explanatory diagram illustrating a fine adjustment mechanism in detail.

Embodiments of the present invention will be described next with reference to the drawings. According to the embodiment of the present invention, a seat reclining apparatus includes a fine adjustment mechanism for finely adjusting an angle between a seat cushion and a seat back and an engaging/disengaging mechanism utilized for roughly adjusting the angle. Configurations, functions and effects according to the embodiment of the present invention will be explained with reference to the drawings as follows. FIG. 1 represents an explanatory view illustrating a seat reclining apparatus according to the embodiment of the present invention seen from the back of a seat. FIG. 2 represents an exploded perspective view illustrating a main part of the seat reclining apparatus. FIG. 3 represents a side cross-sectional view illustrating a main part of the seat reclining apparatus. FIG. 4 represents an explanatory view illustrating the engaging/disengaging mechanism. FIG. 5 represents an explanatory view illustrating the fine adjustment mechanism in detail. Through out the specification and the claims, the term "seat cushion" refers to the seat bottom portion or the forward extending part of the seat that an occupant sits on, as opposed to the seat back, which is the part of the seat that the back of the occupant abuts against.

The fine adjustment mechanism A is utilized by an occupant such as a driver for finely adjusting an angle of a seat back S2. The fine adjustment mechanism A can be operated by the occupant through a manual operation knob or an operation switch, or the like, provided at the side of the seat. The fine adjustment mechanism A can adjust the angle of the seat back continuously or steplessly. The fine adjustment mechanism A is configured with, for example, a planetary gear mechanism, or the like, as shown in FIG. 2 and FIG. 5. A first gear 10 is provided to the seat cushion S1 side for relative rotation with the seat cushion S1. On the other hand, a second gear 12 is provided to the seat back S2 side. An outer gear tooth 10a of the first gear 10 is engaged with an inner gear tooth 12a of the second gear 12. The angle of the seat back S2 can be steplessly adjusted by rotation of the second gear 12 relative to the first gear 10 (Details will be explained later). By utilizing the planetary gear mechanism, large reduction ratio between the first gear 10 and the second gear 12 can be obtained. Therefore, the angle of the seat can be extremely finely adjusted. Further, even when a large load is applied to the seat back S2, because of effects of the reduction ratio, the angle of the seat back S2 can be reliably maintained.

On the other hand, the engaging/disengaging mechanism B is utilized to recline the seat back S2 of a front seat forward by a large angle so that an occupant of a rear seat can get into a vehicle with two doors. The engaging/disengaging mechanism B is also utilized to recline the seat back S2 of the front seat rearward by a large angle so that an occupant of the front seat can utilize the front seat like a bed. In such cases, operations of the manual operation knob or the operation switch provided at the side of the seat, or the like, can adjust the seat back S2 steplessly.

The engaging/disengaging mechanism B includes a base plate 3 fixed to the seat cushion S1 side, and a stopper member 6 provided at the base plate 3. Normally, the stopper member 6 is engaged with the first gear 10 so that the angle of the seat back S2 is fixed. When the angle of the seat back S2 is to be changed by a large angle, the stopper member 6 is disengaged from the first gear 10 and the first gear 10 is rotated relative to the seat cushion S1 up to an arbitrary angle.

The reclining apparatus according to the embodiment of the present invention includes a first shaft 14 for inputting driving force into the fine adjustment mechanism A and a second shaft 1 for inputting operational force into the engaging/disengaging mechanism B. The first shaft 14 and the second shaft 1 are approximately coaxially provided so as to minimize the space occupied by the fine adjustment mechanism A and the engaging/disengaging mechanism B. Next, the fine adjustment mechanism A and the engaging/disengaging mechanism B will be explained in more detail.

As illustrated in FIG. 2, the fine adjustment mechanism A has an operational cam 7, a spring 8, wedges 9, a first bush 11, the first gear 10, the second gear 12, and the first shaft 14.

To actuate the fine adjustment mechanism A, the first shaft 14 is rotated manually or electrically. In the embodiment, as illustrated in FIG. 1, a driving motor M provided in the seat back 52 side drives the first shaft 14. The first shaft 14 includes a spline gear portion provided at a periphery of the first shaft 14 so that the first shaft 14 can be driven by the driving motor M. The operational cam 7 is engaged to one end of the first shaft 14. The operational cam 7 is rotated in unison with the first shaft 14. Because of the operational cam 7, the second gear 12 in the planetary gear mechanism is rotated eccentrically with the first gear 10.

There is a protruding portion 7a at a flange portion 71 of the operational cam 7. The protruding portion 7a is inserted into the opening of the first bush 11 attached to an inner circumference of an opening of the first gear 10. As illustrated in FIG. 5, in addition to the protruding portion 7a, two wedges 9 are mounted inside the first bush 11. A cutout portion 9a is provided at each wedge 9. The spring 8 is fastened to the cutout portions 9a so that the two wedges 9 are biased in the directions such that the two wedges 9 become spaced apart from each other. Accordingly, the two wedges 9 move toward the protruding portion 7a, and the amount of eccentricity of the operational cam 7 relative to the first bush 11 becomes maximum. As a result, the first shaft 14 becomes eccentric relative to the center axis of the first gear 10. The outer gear tooth 10a as a planetary gear portion provided at the other side of the first gear 10 and the inner gear tooth 12a of the second gear 12 are engaged together at one particular position. In addition, it is preferable that the inner circumference of the first bush 11 is treated by such as molybdenum coating to decrease the friction coefficient. In addition, it is also preferable that the wedges 9 are made of a wear-proof material, and treated, for example, with molybdenum coating.

A boss portion 72 of the operational cam 7 is inserted into the center opening of the second gear 12. With the configuration described above, the first shaft 14, the operational cam 7, the wedges 9, and the second gear 12 are eccentric relative to the first gear 10. When the first shaft 14 is driven, the protruding portion 7a of the operational cam 7 and two wedges 9 are rotated together. Accordingly, a position of engagement between the first gear 10 and the second gear 12 moves successively. FIG. 5 represents a situation where the first gear 10 and the second gear 12 are engaged at the top position.

In the embodiment, the number of the outer gear tooth 10a of the first gear 10 is set smaller than the number of the inner gear tooth 12a of the second gear 12 by one or more. In the configuration described above, when the wedges 9 are rotated, the first gear 10 is rotated relative to the second gear 12 as a sun gear and a planet gear, and the angle of the seat back S2 fixed to the second gear 12 can be steplessly adjusted. The angle of a base portion of the seat back S2 is changed through this adjustment. In addition, because the second gear 12 is rotated eccentrically relative to the first gear 10, the base portion of the seat back S2 moves with the eccentric rotation of the second gear 12.

Next, the engaging/disengaging mechanism B will be explained. As illustrated in FIG. 2, the engaging/disengaging mechanism B of the seat reclining apparatus includes the base plate 3 fixed to the seat cushion S1 side, a second shaft 1 inserted into the hole provided at the center of the base plate 3 for inputting operational force into the engaging/disengaging mechanism B, a second bush 2 rotated with the second shaft 1, a cam 5 to which rotational force of the second bush 2 is transmitted, three pawls 6a as a stopper member 6 pushed out or drawn in a direction from a rotational center of the cam 5 to a circumference of the first gear 10 by rotation of the cam 5 where the pawls 6a engage with the first gear 10. The cam 5 includes a lock spring 4 for biasing the cam 5 so that the pawls 6a are normally engaged with the first gear 10. In addition, a holding plate 13 is facing the base plate 3 such that the engaging/disengaging mechanism B and the fine adjustment mechanism A are located between the holding plate 13 and the base plate 3. Therefore, the seat reclining apparatus according to the embodiment of the present invention can be compactly accommodated between the base plate 3 and the holding plate 13.

To recline the seat back S2 forward or backward by a large angle, the second shaft 1 is rotated first. As illustrated in FIG. 3, an operation knob N operated by an occupant is provided at the end of the second shaft 1. The rotational operation is transmitted to the cam 5 through the second bush 2. The second shaft 1 and the second bush 2 are engaged, for example, through a spline engagement. The rotation of the second bush 2 is transmitted to the cam 5. A boss portion 5a of the cam 5 is inserted into the center opening of the base plate 3 so that the cam 5 is attached to the base plate 3. As illustrated in FIG. 4, for example, to roughly adjust the angle of the seat back S2, the cam 5 is rotated clockwise as the cam 5 is seen from inside the seat back and along the second shaft 4. The second shaft 1 is then operated against the biasing force applied by the lock spring 4. Three cam portions 5*b*, or the like, are provided to the cam 5. The cam portions 5*b* apply force to the cam portions 6*b* of the pawls 6*a*, and draw the pawls 6*a* toward the rotational center of the cam 5. The three pawls 6*a* are introduced into the slide grooves 31 formed at an inner surface of the base plate 3. The three pawls 6*a* are pushed out or drawn in a direction from a rotational center of the cam 5 to a circumference of the first gear 10 in this manner. The motions of the three pawls 6*a* are not accompanied with rotations of the three pawls 6*a*. A tooth portion 6*c* is provided at the end of each pawl 6*a*. Each tooth portion 6*c* is engaged with each inner gear tooth 10*b* as a stopper portion provided near a periphery of the first gear 10. The inner gear tooth 10*b* of the first gear 10 can be provided over entire circumference of the first gear 10, but it does not have to be limited in this manner. The inner gear tooth 10*b* of the first gear 10 can also be provided partially along the circumference of the first gear 10 so that the pawls 6*a* are engaged with the first gear 10 through the partially provided inner gear tooth 10*b*.

According to the embodiment of the present invention, as described above, for efficiently providing the fine adjustment mechanism A and the engaging/disengaging mechanism B, the stopper portion, i.e. the inner gear tooth 10*b*, for receiving the pawls 6*a* as the stopper member 6 in a radially outward direction is formed on one side of the first gear 10. In addition, the outer gear tooth 10*a* engaging with the second gear 12 is formed on the other side of the first gear 10 (outer gear tooth of the planetary gear).

As described above, the fine adjustment mechanism A and the engaging/disengaging mechanism B are provided between the base plate 3 and the holding plate 13. The first gear 10 is commonly utilized in the fine adjustment mechanism A and the engaging/disengaging mechanism B. Therefore, a size of the seat width direction can be shorter. As a result, an appropriate seat width can be ensured in a limited space inside the vehicle. Therefore, the seat reclining apparatus can be installed to the seat without degrading design and comfortableness of the seat.

The first gear 10 according to the embodiment can made by punching or the like from one piece of board as a single unit. As illustrated in FIG. 3, the inner gear tooth 10*b* with which the pawls 6*a* are engaged is formed near the peripheral of the first gear 10, and the outer gear tooth 10*a* engaged with the second gear 12 is formed inside of the inner gear tooth 10*b* in a radial direction of the first gear 10 at this time. With regard to the configuration of the engaging/disengaging mechanism B, it is natural that the inner gear tooth 10*b* is formed on the first gear 10 and the pawls 6*a* are pushed outward to engage with the inner gear tooth 10*b*. Then, because the distance between the pushed-out and drawn-in positions of the pawls 6*a* depends on the rotational action of the cam 5, the distance is limited to some degree. As is clearly seen from FIG. 3 to FIG. 5, an engaging depth of the inner gear tooth 10*b* is smaller than the height of the outer gear tooth 10*a* provided at the back surface of the first gear 10. Accordingly, for efficiently receiving a load applied to the seat back S2, the engagement strength between the outer gear tooth 10*a* and the inner gear tooth 10*b* should preferably be equal to engagement strength between the pawls 6*a* and the inner gear tooth 10*b*. In other words, if the pawls 6*a* and the inner gear tooth 10*b*, being engaged in a small depth, are engaged at more outer position in a radial direction, the seat back S2 can be held more firmly, which increases a level of reliability of the seat reclining apparatus.

In addition, the inner gear tooth 10*b* with which the pawls 6*a* are engaged can be made by means of pressing a plate material utilized as the first gear 10. Here, a stepped portion on which the inner gear tooth 10*b* is formed can be made by means of pressing with a protruding die. At the same time, the protruding die makes the protruding portion on the opposite side of the first gear 10. The outer gear tooth 10*a* of the planetary gear mechanism is formed on the protruding portion of the first gear 10. As described above, it is advantageous to form the inner gear tooth 10*b* of the engaging/disengaging mechanism B radially further away from the center when manufacturing the first gear 10.

When the rotational operation of the second shaft 1 is stopped, as illustrated in FIG. 4, the cam 5 is rotated in an inverse direction by the lock spring 4. The cam portion 5*b* of the cam 5 moves the cam portions 6*b* of the pawls 6*a* in a radial direction, and the cam portions 5*c* of the cam 5 push the pawls 6*a* in a radial direction. Then, tooth portions 6*c* of the pawls 6*a* are engaged to the inner gear tooth 10*b* of the first gear 10. Thus, the angle of the seat back S2 can be fixed.

Next, positional relations between the first shaft 14 and the second shaft 1 will be explained. In the seat reclining apparatus according to the embodiment of the present invention, for compactly assembling the fine adjustment mechanism A and the engaging/disengaging mechanism B, the first shaft 14 for the fine adjustment mechanism A and the second shaft 1 for the engaging/disengaging mechanism B are provided approximately coaxially. As illustrated in FIG. 3 or FIG. 5, in the embodiment, the first shaft 14 has a hollow portion. Then, the second shaft 1 is inserted into the first shaft 14. As described above, the first shaft 14 is rotated eccentrically relative to the seat cushion 1. Accordingly, the first shaft 14 is also rotated eccentrically relative to the second shaft 1 for the engaging/disengaging mechanism B. In addition, in the embodiment, as illustrated in FIG. 1, the seat reclining apparatus is provided at each right and left side of the seat. The first shaft 14 and the second shaft 1 are extending between the right and left side of the seat.

As described above, unlike a conventional reclining apparatus having an engaging/disengaging apparatus B provided at an outer circumference area of a fine adjustment mechanism A, the fine adjustment mechanism A and the engaging/disengaging mechanism B are provided approximately coaxially. Therefore, the seat reclining apparatus can be compactly configured. In addition, the term "approximately coaxially" means that a center axis of the second shaft 1 aligns with the center axis of the first shaft 14 or deviated from the center axis of the first shaft 14 to the extent that the center axis of the second shaft 1 can be located within a region defined by the outer diameter of the first shaft 14.

In the seat reclining apparatus according to the embodiment of the present invention, the second shaft 1 is inserted into the first shaft 14. The first shaft 14 revolves around the second shaft 1. Accordingly, because the second shaft 1 is inserted into the first shaft 14, the second shaft 1 can be completely accommodated in the first shaft 14. The first shaft 14 and the second shaft 1 can also serve as members for connecting the reclining apparatuses provided at right and left sides of the seat cushion S1. Accordingly, when two shafts are provided between the right and left sides of the seat, the configuration can be made more compact. In addition, the second shaft 1 does not become an obstacle for transmitting driving force of the motor M to the first shaft 14. Thus, the driving mechanism can be designed with a greater degree of freedom.

As described above, in the seat reclining apparatus according to the embodiment of the present invention, because the first shaft 14 for the fine adjustment mechanism A and the second shaft 1 for the engaging/disengaging mechanism B are approximately coaxially provided in side view of the seat, the seat reclining apparatus can save space. As a result, the number of coverings for covering the seat reclining apparatus can also be reduced. Thus, costs for manufacturing the seat reclining apparatus can be lowered.

In addition, because the first gear 10 is commonly utilized by the fine adjustment mechanism A and the engaging/disengaging mechanism B, and the fine adjustment mechanism A and the engaging/disengaging mechanism B are accommodated between the base plate 3 and the holding plate 13, size of the seat reclining apparatus in the seat width direction does not have to be excessively large. As a result, an appropriate seat width can be obtained. Therefore, the seat reclining apparatus can be installed to the seat without degrading a design of the seat and a comfortableness of the seat for an occupant.

Other embodiments of the present invention will be explained next. In the embodiment described above, the base plate 3 was fixed to the seat cushion S1 side, and the second gear 12 was fixed to the seat back S2 side. Alternately, the base plate 3 can be fixed to the seat back S2 side, and the second gear 12 can be fixed to the seat cushion S1 side. If so configured, because heavy parts such as a motor can be provided at the seat cushion S1 side, a weight of the seat back S2 side can be reduced. Thus, a seat can have superior property for enduring collision.

According to another embodiment of the present invention, an inner gear tooth of the planetary gear mechanism can be provided at the first gear 10, and an outer gear tooth of the planetary gear mechanism can be provided at the second gear 12. In this case, it is natural that the tooth portion with which the pawls 6a engage is made as an outer gear tooth. In this case, the pawls 6a are engaged inwardly in a radial direction. If only sufficient engagement strength of the pawls 6a can be obtained, an inner gear tooth and an outer gear tooth of the planetary gear mechanism can be provided at the second gear 12 and the first gear 10 respectively, or inversely, at the first gear 10 and the second gear 12 respectively.

In the embodiment of the present invention described above, a planetary gear mechanism having two gears, that is, the first gear 10 and the second gear 12, was employed as the fine adjustment mechanism A. However, it does not have to be so limited. According to another embodiment of the present invention, a conventional planetary gear mechanism having three gears can be employed in the fine adjustment mechanism A. For example, a mechanism having three gears, that is, a ring gear, a planetary gear, and a sun gear, can be employed. According to the embodiment of the present invention, the ring gear is fixed to the seat cushion side, the sun gear is fixed to the seat back side, and the planetary gear serves as a stopper mechanism for roughly adjusting the angle of the seat back.

When the sun gear is driven by a motor, the rotation of the motor is transmitted to the ring gear. The rotational frequency of the ring gear is then reduced from the rotational frequency of the motor by the reduction ratio. Therefore, the angle of the seat back can be finely adjusted. When the rotation of the planetary gear is locked/unlocked, the ring gear can be freely rotated around the sun gear. Then, the seat back can be flattened or folded.

According to an embodiment of the present invention, the center axis of the first shaft for inputting an operating force to the fine adjustment mechanism A and a center axis of the second shaft for inputting operating force to the engaging/disengaging mechanism B can be provided completely coaxially. Accordingly, the seat reclining mechanism can be compactly configured. In addition, the seat reclining mechanism can alleviate the drawback that the seat back shakes when the angle of the seat back is operated to change.

In sum, a seat reclining apparatus includes a fine angle adjustment mechanism for finely adjusting an angle between a seat cushion and a seat back of a seat and including a planetary gear mechanism having a first gear provided to a seat cushion side of the seat for relative rotation with respect to the seat cushion and a second gear fixed to a seat back side of the seat and an engaging/disengaging mechanism for controlling the relative rotation between the seat cushion and the seat back of the seat and including a base plate fixed to the seat cushion side and a stopper member provided to the base plate and engageable with or disengageable from the first gear. The relative rotation of the first gear with respect to the seat cushion is restricted when the stopper member engages with the first gear and the relative rotation of the first gear to the seat cushion is allowed when the stopper member disengages from the first gear. The seat reclining apparatus is characterized in that a first shaft for inputting operating force to the fine adjustment mechanism is arranged approximately coaxially with a second shaft for transmitting an operating force to the engaging/disengaging mechanism.

Accordingly, unlike a conventional seat reclining apparatus having an engaging/disengaging mechanism provided at outer circumferential area of a fine adjustment mechanism, the seat reclining apparatus includes the fine adjustment mechanism and the engaging/disengaging mechanism arranged approximately coaxially. Accordingly, size of the seat reclining apparatus can be relatively smaller than that of the conventional seat reclining apparatus as seen in the axial direction of the operational shaft of both mechanisms. As a result, a size of an entire seat reclining apparatus can be made compact. In addition, covering members provided around the seat reclining apparatus can also be made compact. Therefore, costs for entire seat reclining apparatus can be lowered. Further, appearance of the side of the seat cushion can be improved. The term "arranged approximately coaxially" includes a condition that the both mechanisms are arranged coaxially. Further, the term "arranged approximately coaxially" includes a situation where the two axes coincide and means that the both center axes are spaced apart from each other only by a distance such that the center axis of the second shaft is located within a region defined by the outer diameter of the first shaft when seen from center axes of both shafts.

Also, in the seat reclining apparatus, an axial center of the first shaft can be aligned with an axial center of the second gear of the planetary gear mechanism and an axial center of the second shaft can be aligned with an axial center of the first gear of the planetary gear mechanism.

Also, the planetary gear mechanism of the fine adjustment mechanism includes the first gear and the second gear. The center axes of the gears are eccentric with each other while the gears are rotated relative to each other. As the reduction ratio between the gears is set large, a rotational frequency of the first gear is largely reduced when transmitted to the second gear. Therefore, even when a certain level of torque is applied to the second gear, the large torque is not directly transmitted to the first gear. Accordingly, posture of the seat back fixed to the second gear can be firmly maintained. Employing the first gear and the second gear described above, a compact seat reclining apparatus made from small number of parts can be obtained. Accordingly, because the fine adjustment mechanism and the engaging/disengaging mechanism are configured so that the center axis of the first shaft and the center axis of the second gear are arranged coaxially and so that the center axis of the second shaft and the center axis of the first gear are arranged coaxially, a rotational mechanism for each mechanism can be obtained without increasing excessive parts. Accordingly, an entire seat reclining apparatus can be made simple and with a compact configuration.

In addition, in the seat reclining apparatus, the first shaft can include a hollow portion therein for inserting the second shaft.

Normally, a seat reclining apparatus like the one described above is provided at both right and left sides of the seat cushion for reliably fixing the seat back. As configuration described above where the second shaft is inserted into the first shaft, the second shaft, as a member for connecting between the seat reclining apparatuses provided at the right and left, can be completely accommodated in the first shaft. Accordingly, two shafts extending between the right and left sides of the seat can be compactly arranged. In addition, the second shaft does not become an obstacle when driving force of a motor is transmitted to the first shaft. Thus, a driving mechanism can be designed with greater freedom.

Also, in the seat reclining apparatus, a stopper portion can be formed on one side of the first gear for receiving the stopper member outwardly in a radial direction, and a planetary gear portion can be formed on the other side of the first gear for engaging with the second gear.

Therefore, the first gear is commonly utilized for the fine adjustment mechanism and the engaging/disengaging mechanism. Accordingly, a size of the seat reclining apparatus in a seat width direction can be made short. As a result, length of an area on which an occupant takes a seat in a seat width direction can be sufficiently obtained.

In addition, in the seat reclining apparatus, the stopper portion can be located radially further away from the axial center of the first gear than the planetary gear.

The engaging/disengaging mechanism is utilized, for fixing an angle of the seat back by moving the stopper member outwardly in a radial direction by means of such as rotational operation of a cam. Then, a distance between the positions of the stopper member in its pushed-out and drawn-in positions depends on the cam. Therefore, the distance is limited to some degree. On the other hand, the planetary gear mechanism of the fine adjustment mechanism is not so complexly configured. Therefore, height of the gear can be easily configured higher than the height of the stopper member. Accordingly, for efficiently receiving a load applied to the seat back, the stopper portion is located further away from the axial center of the first gear to compensate for the small engaging height of the stopper member. Thus, sufficiently large moment can be generated by the stopper member. Accordingly, the seat reclining apparatus with high reliability can be obtained.

INDUSTRIAL USE

The seat reclining apparatus according to embodiments of the present invention can be employed for a seat of a vehicle. More particularly, the seat reclining apparatus according to embodiments of the present invention can be employed for a seat of a vehicle having a fine adjustment mechanism A for finely adjusting an angle between a seat cushion S1 and a seat back S2 and an engaging/disengaging mechanism for largely changing the angle.

The invention claimed is:

1. A seat reclining apparatus comprising:
   a pair of fine angle adjustment mechanisms arranged on respective sides in a width direction of a seat for finely adjusting an angle between a seat cushion and a seat back of the seat and each adjustment mechanism including a planetary gear mechanism having only a first gear provided to a seat cushion side of the seat for relative rotation with respect to the seat cushion and a second gear fixed to a seat back side of the seat;
   a pair of engaging/disengaging mechanisms arranged on respective sides in the width direction of the seat for controlling the relative rotation between the seat cushion and the seat back of the seat and each engaging/disengaging mechanism including a base plate fixed to the seat cushion side and a stopper member provided to the base plate and engageable with or disengageable from the first gear, wherein the relative rotation of the first gear with respect to the seat cushion is restricted when the stopper member engages with the first gear and the relative rotation of the first gear to the seat cushion is allowed when the stopper member disengages from the first gear,
   wherein a first shaft having a hollow portion for inputting an operating force to the fine adjustment mechanisms is arranged approximately coaxially with a second shaft disposed radially inside of the first shaft for transmitting an operating force to the engaging/disengaging mechanisms;
   wherein the pair of fine angle adjustment mechanisms are connected with respective sides of the first shaft and the pair of engaging/disengaging mechanisms are connected with respective sides of the second shaft,
   the apparatus further including a driving motor for driving the first shaft and arranged between the pair of fine angle adjustment mechanisms.

2. The seat reclining apparatus according to claim 1, wherein
   an axial center of the first shaft is aligned with an axial center of the second gear of the planetary gear mechanism and an axial center of the second shaft is aligned with an axial center of the first gear of the planetary gear mechanism.

3. The seat reclining apparatus according to claim 1, wherein
   a stopper portion is formed on one side of the first gear for receiving the stopper member outwardly in a radial direction, and a planetary gear portion is formed on the other side of the first gear for engaging with the second gear.

4. The seat reclining apparatus according to claim 2, wherein
   a stopper portion is formed on one side of the first gear for receiving the stopper member outwardly in a radial direction, and a planetary gear portion is formed on the other side of the first gear for engaging with the second gear.

5. The seat reclining apparatus according to claim 3, wherein
   the stopper portion is located radially further away from the axial center of the first gear than the planetary gear portion.

6. The seat reclining apparatus according to claim 4, wherein
   the stopper portion is located radially further away from the axial center of the first gear than the planetary gear portion.

* * * * *